United States Patent
Han et al.

(10) Patent No.: US 9,958,973 B2
(45) Date of Patent: May 1, 2018

(54) TOUCH PANEL AND TOUCH PANEL-INTEGRATED ORGANIC LIGHT EMITTING DISPLAY DEVICE

(71) Applicant: LG DISPLAY CO., LTD., Seoul (KR)

(72) Inventors: JongHyun Han, Paju-si (KR); SeJong Yoo, Paju-si (KR); YoungJin Choe, Goyang-si (KR); HaeYeon Jeong, Osan-si (KR); SunJu Lee, Seongnam-si (KR)

(73) Assignee: LG DISPLAY CO., LTD., Seoul (KR)

( * ) Notice: Subject to any disclaimer, the term of this patent is extended or adjusted under 35 U.S.C. 154(b) by 305 days.

(21) Appl. No.: 14/738,163

(22) Filed: Jun. 12, 2015

(65) Prior Publication Data

US 2016/0117031 A1 Apr. 28, 2016

(30) Foreign Application Priority Data

Oct. 24, 2014 (KR) .................. 10-2014-0145383
Dec. 24, 2014 (KR) .................. 10-2014-0188530

(51) Int. Cl.
 *G06F 3/045* (2006.01)
 *G06F 3/041* (2006.01)
 *G06F 3/044* (2006.01)

(52) U.S. Cl.
 CPC ............ *G06F 3/0412* (2013.01); *G06F 3/044* (2013.01); *G06F 2203/04107* (2013.01); *G06F 2203/04111* (2013.01); *G06F 2203/04112* (2013.01)

(58) Field of Classification Search
 CPC .................. G06F 3/0412; G06F 3/044; G06F 2203/04111; G06F 2203/04107; G06F 2203/04112; G06F 3/041; G06F 3/045
 See application file for complete search history.

(56) References Cited

U.S. PATENT DOCUMENTS

| | | | | |
|---|---|---|---|---|
| 2010/0302201 A1* | 12/2010 | Ritter | ...................... | G06F 3/044 345/174 |
| 2011/0090154 A1* | 4/2011 | Kuo | ........................ | G06F 3/044 345/173 |
| 2011/0310033 A1* | 12/2011 | Liu | ........................ | G06F 3/0412 345/173 |
| 2012/0075226 A1* | 3/2012 | Andoh | .................... | G06F 3/046 345/173 |
| 2013/0234734 A1* | 9/2013 | Iida | ........................ | G06F 3/044 324/661 |

(Continued)

*Primary Examiner* — Claire X Pappas
*Assistant Examiner* — Gerald Oliver
(74) *Attorney, Agent, or Firm* — Dentons US LLP

(57) ABSTRACT

Provided is a touch panel-integrated organic light emitting display device. The touch panel-integrated organic light emitting display device includes an upper substrate, a lower substrate and a touch panel positioned between the upper substrate and the lower substrate. The touch panel includes an array of first touch electrodes connected in a first direction under the upper substrate, an array of second touch electrodes, in a same plane as the first touch electrodes, connected in a second direction perpendicular to the first direction under the upper substrate, a plurality of connection electrodes connecting the second touch electrodes in the second direction, and at least one of the first and second touch electrodes includes a touch detection part and a floating part electrically isolated from the touch detection part.

18 Claims, 18 Drawing Sheets

(56) References Cited

U.S. PATENT DOCUMENTS

| | | | | |
|---|---|---|---|---|
| 2014/0240291 A1* | 8/2014 | Nam | G06F 3/0416 | |
| | | | 345/174 | |
| 2014/0362029 A1* | 12/2014 | Mo | G06F 3/044 | |
| | | | 345/174 | |
| 2015/0002752 A1* | 1/2015 | Shepelev | G06F 3/044 | |
| | | | 349/12 | |
| 2015/0109245 A1* | 4/2015 | Chou | G06F 3/044 | |
| | | | 345/174 | |
| 2015/0206501 A1* | 7/2015 | Kurasawa | G09G 3/2092 | |
| | | | 345/206 | |
| 2015/0370375 A1* | 12/2015 | Hayashi | G06F 3/044 | |
| | | | 345/174 | |
| 2016/0274702 A1* | 9/2016 | Satou | G06F 3/044 | |
| 2016/0299627 A1* | 10/2016 | Yang | G06F 3/044 | |
| 2016/0306453 A1* | 10/2016 | Lee | H01H 1/06 | |

* cited by examiner

도 3b

TOUCH PANEL AND TOUCH PANEL-INTEGRATED ORGANIC LIGHT EMITTING DISPLAY DEVICE

CROSS-REFERENCE TO RELATED APPLICATIONS

This application claims the priority of Korean Patent Application No. 10-2014-0145383 filed on Oct. 24, 2014 and No. 10-2014-0188530 filed on Dec. 24, 2014, in the Korean Intellectual Property Office, the disclosure of which is incorporated herein by reference.

BACKGROUND OF THE INVENTION

Field of the Disclosure

This disclosure relates to a touch panel and a touch panel-integrated organic light emitting display device. More particularly, the disclosure relates to a touch panel and a touch panel-integrated organic light emitting display device having an improved touch detecting capability with reduced thickness.

Description of the Related Art

A touch panel is a device configured to detect a touch input from a user on a display device, and has been widely used for personal portable devices such as a smart phone, tablet PCs, and large-sized display devices such as a display device in public facilities and smart TV.

In recent years, in order for a display device to have reduced thickness and improved visibility, there has been developed an in-cell touch panel-integrated display device manufactured by integrating a touch panel and a display device.

An in-cell touch panel includes a first touch electrode, a second touch electrode, and a connection electrode. The first and second touch electrodes intersect at an intersection area, and the second touch electrode is divided in the intersection area. The first touch electrode passes through between the second touch electrodes divided in the intersection area, and the connection electrode connects the divided second touch electrode. When an electrostatic object is brought into contact with the touch panel, the touch panel can detect a touch input by detecting a change in a mutual capacitance between the first and second touch electrodes.

However, as a thickness of the touch panel is decreased, a thickness of a cover film covering an upper surface of the touch panel may also be decreased. Due to the thin cover film, a gap between the first and second touch electrodes and a user's finger is decreased. In this case, a parasitic capacitance between the first and second touch electrodes and the user's finger may be increased, and an unintended touch signal may be generated at any position other than the actual contact position due to the parasitic capacitance. This phenomenon is referred to as "retransmission". The retransmission decreases touch sensibility of the touch panel and ultimately results in malfunction of touch sensing.

SUMMARY OF THE INVENTION

Details of exemplary embodiments will be included in the detailed description of the invention and the accompanying drawings.

The present invention has an effect of minimizing a parasitic capacitance generated between a first touch electrode and an electrostatic object or between a second touch electrode and the electrostatic object by forming a floating part in each of the first and second touch electrodes.

The present invention has an effect of compensating a decrease in a mutual capacitance caused by the floating part by dividing the first touch electrode into a first sub-electrode and a second sub-electrode and increasing the number of intersection areas of the first and second touch electrodes.

The present invention has an effect of minimizing a decrease in visibility caused by the floating parts by forming the floating parts of the first and second touch electrodes with the same material as that of touch detection parts of the first and second touch electrodes.

The present invention has an effect of improving touch sensitivity by controlling a capacitance affected by thickness of a display device.

The effects of the present invention are not limited to the aforementioned effects, and other various effects are included in the present specification.

BRIEF DESCRIPTION OF THE DRAWINGS

The above and other aspects, features and advantages of the present invention will be more clearly understood from the following detailed description taken in conjunction with the accompanying drawings, in which.

DETAILED DESCRIPTION OF THE ILLUSTRATED EMBODIMENTS

Figure 1:
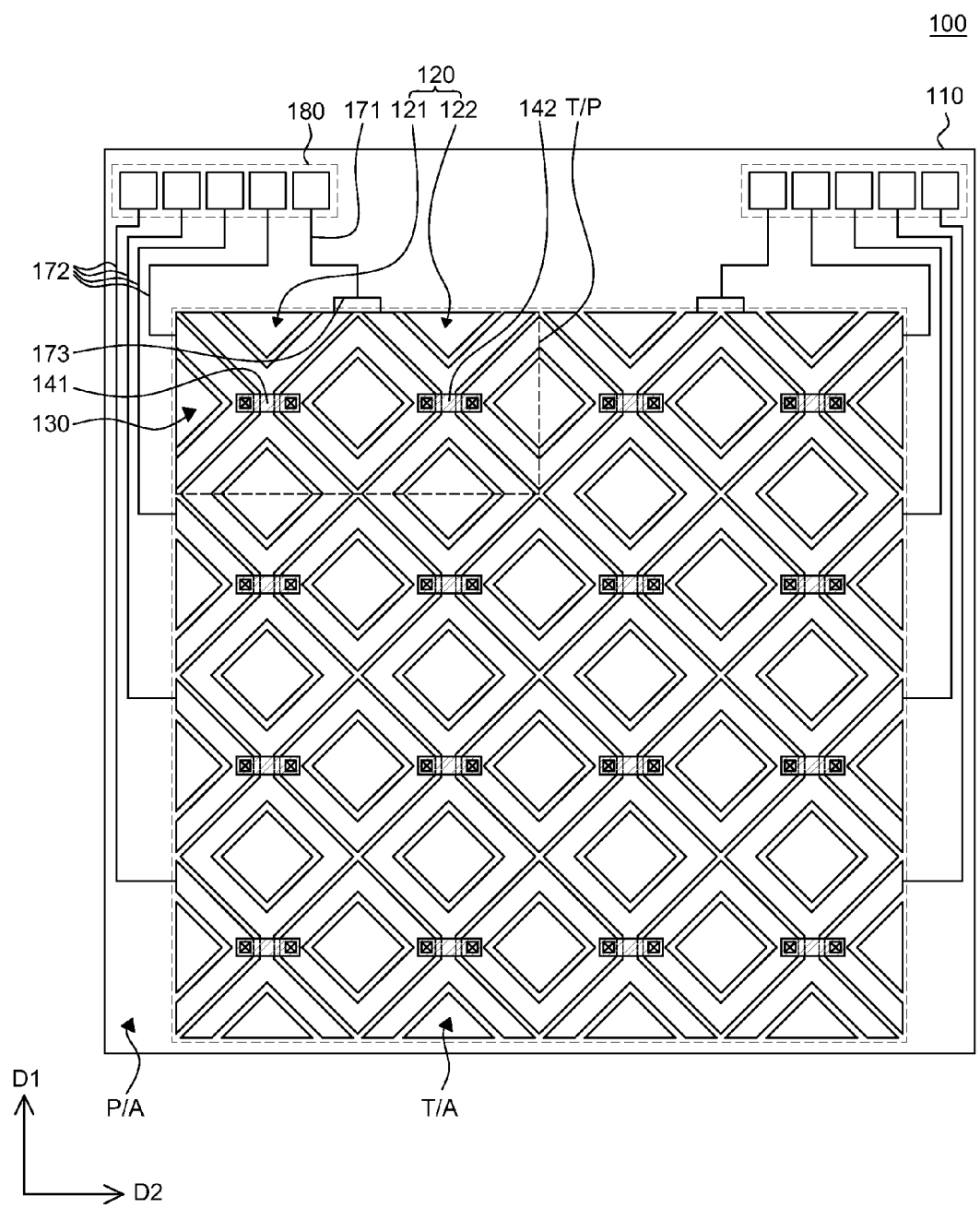
FIG. 1 is a schematic plane view of a touch panel according to an exemplary embodiment of the present invention.

Advantages and features of the present invention, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined by the appended claims.

The shapes, sizes, ratios, angles, numbers, and the like illustrated in the accompanying drawings for describing the exemplary embodiments of the present invention are merely examples, and the present invention is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present invention.

Throughout the whole specification, the same reference numerals denote the same elements.

Since size and thickness of each component illustrated in the drawings are represented for convenience in explanation, the present invention is not necessarily limited to the illustrated size and thickness of each component.

The features of various embodiments of the present invention can be partially or entirely bonded to or combined with each other and can be interlocked and operated in technically various ways as can be fully understood by a person having ordinary skill in the art, and the embodiments can be carried out independently of or in association with each other.

Various exemplary embodiments of the present invention will be described in detail with reference to the accompanying drawings.

Figure 2:
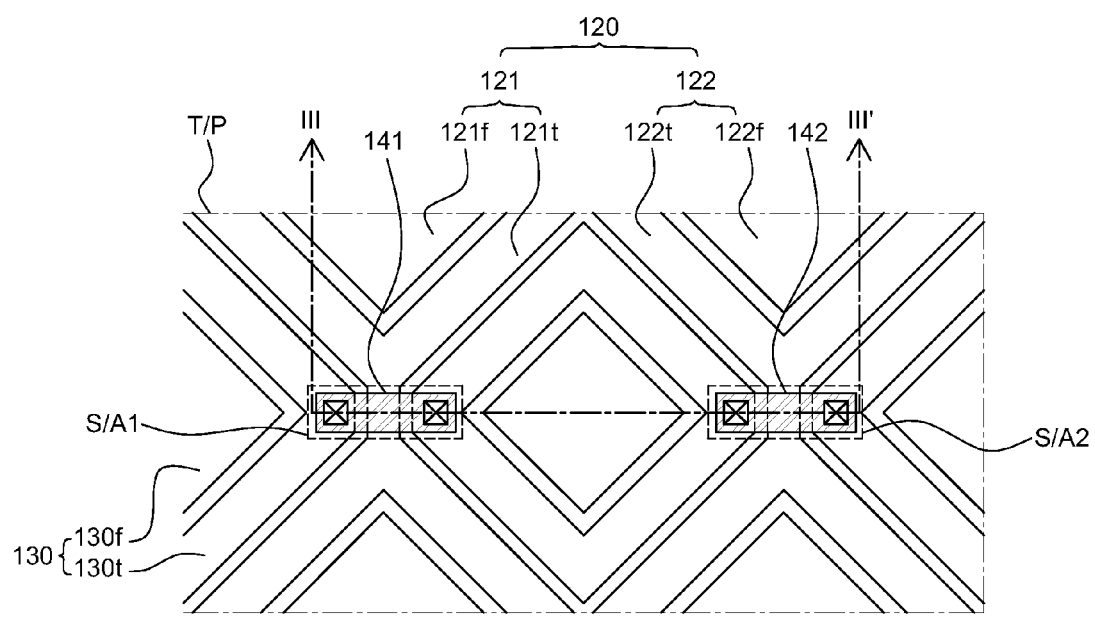
FIG. 2 is a schematic plane view of an area T/P of FIG. 1 indicating a touch pixel of the touch panel according to the exemplary embodiment of the present invention.
Figure 3A:
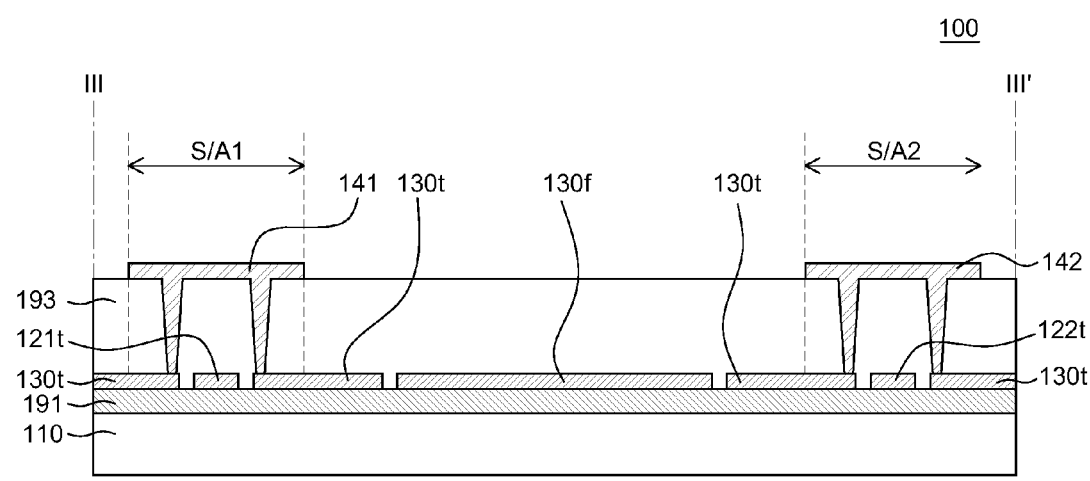
FIG. 3A is a schematic cross-sectional view of the touch panel taken along a line III-III' of FIG. 2.

FIG. 1 is a schematic plane view of a touch panel according to an exemplary embodiment of the present invention. FIG. 2 is a schematic plane view of an area T/P of FIG. 1 indicating a touch pixel of the touch panel according to an exemplary embodiment of the present invention. FIG. 3A is a schematic cross-sectional view of the touch panel taken along a line III-III' of FIG. 2. Referring to FIG. 1 to FIG. 3A, a touch panel 100 includes a substrate 110, a first touch electrode 120, a second touch electrode 130, a first connection electrode 141, a second connection electrode 142, a connection routing line 173, a first routing line 171, a second routing line 172, and a pad 180. In FIG. 1 to FIG. 3A, the shapes of the first touch electrode 120, the second touch electrode 130, the first connection electrode 141, and the second connection electrode 142 of the touch panel are schematically illustrated. The shapes, thicknesses, and numbers of the first touch electrode 120, the second touch electrode 130, the first connection electrode 141, and the second connection electrode 142 are not limited to that illustrated in FIG. 1 to FIG. 3A.

The substrate 110 is configured to support various elements of the touch panel 100 and may be a glass substrate or a plastic substrate. In some exemplary embodiments, the substrate 110 may be a flexible substrate having flexibility.

The substrate 110 includes a touch area T/A and a peripheral area P/A. In the touch area T/A, the first touch electrode 120, the second touch electrode 130, the first connection electrode 141, and the second connection electrode 142 are disposed. The peripheral area P/A surrounds the touch area T/A, and the connection routing line 173, the first routing line 171, the second routing line 172, and the pad 180 are disposed therein. In FIG. 1, the touch area T/A and the peripheral area P/A are formed into squares. However, the touch area T/A and the peripheral area P/A may be formed into other polygons in addition to squares, circles, or ovals.

The first touch electrode 120 and the second touch electrode 130 are disposed in the touch area T/A of the substrate 110 and are extended in different directions from each other. For example, the first touch electrode 120 is extended in a first direction D1, and the second touch electrode 130 is extended in a second direction D2 different from the first direction D1. In FIG. 1, the first direction D1 is illustrated as a longitudinal direction of the substrate 110 and the second direction D2 is illustrated as a transverse direction of the substrate 110 for convenience in explanation. However, the first direction D1 and the second direction D2 are arbitrary directions, and the first direction D1 and the second direction D2 are not limited thereto.

Each of the first touch electrode 120 and the second touch electrode 130 includes a plurality of electrode planes having a specific shape when viewed from the top of the touch panel 100. In FIG. 1, each of the first touch electrode 120 and the second touch electrode 130 includes electrode planes having a diamond shape for convenience in explanation. That is, the first touch electrode 120 includes diamond-shaped electrode planes connected with each other along the first direction D1, and the second touch electrode 130 includes diamond-shaped electrode planes connected with each other along the second direction D2. However, the shape of the electrode plane of the first touch electrode 120 and the second touch electrode 130 is not limited thereto.

The electrode planes of the first touch electrode 120 and the second touch electrode 130 are cyclically repeated. A touch pixel T/P is defined on the basis of the cyclically repeated electrode planes of the first touch electrode 120 and the second touch electrode 130. That is, the touch area T/A of the touch panel 100 includes a plurality of touch pixels T/P, and the electrode planes of the first touch electrode 120 and the second touch electrode 130 are repeated for each touch pixel T/P. In FIG. 1, a size of the touch pixel T/P is schematically illustrated. Although the touch pixel T/P has a rectangular shape in FIG. 1, the shape of the touch pixel T/P is not limited thereto.

The touch panel 100 may include a plurality of first touch electrodes 120 and second touch electrodes 130. For example, the plurality of first touch electrodes 120 extended in the first direction D1 and the plurality of second touch electrodes 130 extended in the second direction D2 may be disposed in the touch area T/A of the substrate 110. In FIG. 1, the touch panel 100 including two first touch electrodes 120 and four second touch electrodes 130 is illustrated for convenience in explanation. In FIG. 2, a part of respective electrode planes of the first sub-electrode 121, the second sub-electrode 122, and the second touch electrode 130 are illustrated.

The first touch electrode 120 and the second touch electrode 130 are disposed on a color filter layer 191 of the substrate 110 as illustrated in FIG. 3A. However, the color filter layer 191 is not necessarily needed. In some exemplary embodiments, the color filter layer 191 may be omitted and the first touch electrode 120 and the second touch electrode 130 may be disposed on the substrate 110. In some exemplary embodiments, a buffer layer may be further disposed between the substrate 110 and the first and second touch electrodes 120 and 130 in order to prevent penetration of impurities and moisture from the substrate 110.

Each of the first touch electrode 120 and the second touch electrode 130 may be a transparent electrode formed of transparent conductive oxide (TCO). For example, each of the first touch electrode 120 and the second touch electrode 130 may be a transparent electrode formed of indium tin oxide (ITO), indium zinc oxide (IZO), indium tin zinc oxide (ITZO), zinc oxide, tin oxide, and the like. Therefore, when the touch panel 100 is applied to a display device, visibility and a transmittance of the display device is not greatly decreased due to the first touch electrode 120 and the second touch electrode 130.

The first touch electrode 120 includes the first sub-electrode 121 and the second sub-electrode 122. That is, the first touch electrode 120 is divided into the first sub-electrode 121 and the second sub-electrode 122. The first sub-electrode 121 and the second sub-electrode 122 are connected with each other and together serve as the single first touch electrode 120. The first sub-electrode 121 and the second sub-electrode 122 are connected with each other by the connection routing line 173 in the peripheral area P/A and are divided from each other in the touch area T/A.

The first sub-electrode 121 and the second sub-electrode 122 are extended in directions parallel to each other and include electrode planes of the same shape. In FIG. 1, the first sub-electrode 121 and the second sub-electrode 122 extended in the first direction D1 and including a plurality of diamond-shaped electrode planes are illustrated.

As illustrated in FIG. 2, the first sub-electrode 121 includes a floating part 121$f$ and a touch detection part 121$t$. The floating part 121$f$ is electrically isolated from the touch detection part 121$t$. That is, the floating part 121$f$ of the first sub-electrode 121 is electrically floated from the touch detection part 121$t$ of the first sub-electrode 121. The touch detection part 121$t$ of the first sub-electrode 121 is electrically connected with the first routing line 171 and a touch detection part 122$t$ of the second sub-electrode 122. In some exemplary embodiments, the floating part 121$f$ may be electrically grounded.

The floating part 121$f$ of the first sub-electrode 121 may have a diamond shape as illustrated in FIG. 1, but the shape of the floating part 121$f$ is not limited thereto and the floating part 121$f$ may be formed into various shapes. The touch detection part 121$t$ of the first sub-electrode 121 surrounds the floating part 121$f$. For example, a hole is provided to each electrode plane of the first sub-electrode 121, and the floating part 121$f$ is disposed within the hole. In this case, a part of the first sub-electrode 121 surrounding the floating part 121$f$ is referred to as the touch detection part 121$t$. In FIG. 1, the floating part 121$f$ and the touch detection part 121$t$ are illustrated so as to have the same central point, but central points of the floating part 121$f$ and the touch detection part 121$t$ may be different from each other since the floating part 121$f$ only needs to be electrically isolated from the touch detection part 121$t$. In some exemplary embodiments, the touch detection part 121$t$ of the first sub-electrode 121 may not surround the floating part 121$f$, and the floating part 121$f$ may be arranged outside the touch detection part 121$t$.

The floating part 121$f$ has a predetermined area. For example, the floating part 121$f$ may have an area ratio of 10% to 65% with respect to a total area of the first sub-electrode 121. The total area of the first sub-electrode 121 refers to the sum of areas of the floating part 121$f$ and the touch detection part 121$t$. That is, assuming that an area of the touch detection part 121$t$ of the first sub-electrode is "A" and an area of the floating part 121$f$ of the first sub-electrode 121 is "B", a value of "B/(A+B)" may be in a range of 0.1 to 0.65.

Referring to FIG. 1 and FIG. 2, the second sub-electrode 122 includes a floating part 122$f$ and a touch detection part 122$t$. The second sub-electrode 122 is substantially the same as the first sub-electrode 121, and, thus, redundant explanation thereof will be omitted.

The second touch electrode 130 intersects the first touch electrode 120. The second touch electrode 130 may be divided into a first sub-intersection area S/A1 and a second sub-intersection area S/A2. That is, the second touch electrode 130 is divided at the first sub-intersection area S/A1, and the touch detection part 121$t$ of the first sub-electrode 121 at the first sub-intersection area S/A1 passes through between the divided second touch electrodes 130. Further, the second touch electrode 130 is divided at the second sub-intersection area S/A2, and the touch detection part 122$t$ of the second sub-electrode 122 at the second sub-intersection area S/A2 passes through between the divided second touch electrodes 130.

The second touch electrode 130 includes a floating part 130$f$ and a touch detection part 130$t$. The touch detection part 130$t$ and the floating part 130$f$ of the second touch electrode 130 are substantially the same as the touch detection part 121$t$ and the floating part 121$f$ of the first sub-electrode 121, and, thus, redundant explanation thereof will be omitted.

The first routing line 171 is disposed in the peripheral area P/A of the substrate 110 and electrically connected with the first touch electrode 120. For example, the touch detection part 121$t$ of the first sub-electrode 121 and the touch detection part 122$t$ of the second sub-electrode 122 are connected with each other by the connection routing line 173, and the first routing line 171 is connected with the connection routing line 173. The first routing line 171 is connected with the pad 180, and the first touch electrode 120 is connected with the pad 180 through the connection routing line 173 and the first routing line 171. The second routing line 172 is disposed in the peripheral area P/A of the substrate 110 and connects the second touch electrode 130 with the pad 180. For example, the second routing line 172 is connected with the touch detection part 130*t* of the second touch electrode 130.

The pad 180 is arranged in the peripheral area P/A of the substrate 110 and connected with each of the first routing line 171 and the second routing line 172. The pad 180 transmits a touch signal received from the first routing line 171 and the second routing line 172 to an external circuit.

An overcoating layer 193 is disposed on the first touch electrode 120 and the second touch electrode 130. For example, the overcoating layer 193 may cover an entire upper surface of the substrate 110 including the first touch electrode 120, the second touch electrode 130, the first routing line 171, and the second routing line 172. The overcoating layer 193 may be a transparent insulating layer.

The overcoating layer 193 includes a plurality of contact holes that expose a part of the second touch electrode 130. For example, as illustrated in FIG. 3A, the contact holes of the overcoating layer 193 may expose the touch detection part 130*t* of the second touch electrode 130 at the first sub-intersection area S/A1 and the second sub-intersection area S/A2.

The first connection electrode 141 connects the touch detection part 130*t* of the second touch electrode 130 divided at the first sub-intersection area S/A1 with each other. The first connection electrode 141 is electrically connected with the touch detection part 130*t* of the second touch electrode 130 via the contact holes in the overcoating layer 193. The touch detection part 121*t* of the first sub-electrode 121 passes through under the first connection electrode 141, and the first connection electrode 141 is overlapped with a part of the touch detection part 121*t* of the first sub-electrode 121. The first connection electrode 141 may be formed of a low-resistance metal in order to lower a total resistance of the second touch electrode 130. For example, the first connection electrode 141 may be formed of any one member selected from the group consisting of molybdenum (Mo), aluminum (Al), chromium (Cr), gold (Au), titanium (Ti), nickel (Ni), neodymium (Nd), and copper (Cu), or alloys thereof.

The second connection electrode 142 connects the touch detection part 130*t* of the second touch electrode 130 divided at the second sub-intersection area S/A2. The second connection electrode 142 is substantially the same as the first connection electrode 141, and, thus, redundant explanation thereof will be omitted.

As described above, when an electrostatic object such as a finger is brought into contact with a touch panel, the touch panel detects a touch input by detecting a change in a mutual capacitance between first and second touch electrodes at a contact point. However, as thickness of the touch panel is decreased, a gap between the finger and the first and second touch electrodes may be decreased. In this case, the finger may generate a parasitic capacitance at any position other than the contact point, and the parasitic capacitance may cause retransmission of a mutual capacitance at any position other than the contact point is changed. Therefore, a touch signal may be generated at any position other than the contact point, or a touch signal generated at another position may cancel out a touch signal at the contact point and a touch input may not be detected. The retransmission can be reduced by setting the finger and the first and second touch electrodes to be distant from each other. However, in order to set the finger and the first and second touch electrodes to be distant from each other, thickness of the touch panel needs to be increased. Therefore, the touch panel cannot be made thin and thus cannot be applied to a flexible display device.

The touch panel 100 according to the exemplary embodiment of the present invention may have reduced thickness, and retransmission may rarely occur. To be specific, the floating part 121*f* of the first sub-electrode 121, the floating part 122*f* of the second sub-electrode 122, and the floating part 130*f* of the second touch electrode 130 reduce a parasitic capacitance between the finger and the first touch electrode 120 and a parasitic capacitance between the finger and the second touch electrode 130. A capacitance is inversely proportional to a distance between two electric conductors facing each other and is proportional to an area of the electric conductors. The floating parts of the first touch electrode 120 and the second touch electrode 130 are electrically isolated from the touch detection parts, respectively, and, thus, an area of effective electrode planes of the first touch electrode 120 and the second touch electrode 130 is decreased. Therefore, the parasitic capacitance between the finger and the first touch electrode 120 and between the finger and the second touch electrode 130 may be decreased, respectively, and the retransmission may rarely occur. The retransmission may be further decreased as an area of the floating parts is increased. For example, when an area of the floating part accounts for about 40% of the total area of the touch electrode, the parasitic capacitance can be reduced by about half compared to a case where the floating part is not formed.

Meanwhile, as an effective area of the electrode planes of the first touch electrode 120 and the second touch electrode 130 is decreased, a mutual capacitance between the first touch electrode 120 and the second touch electrode 130 may also decrease. If the mutual capacitance is decreased, touch sensitivity of the touch panel 100 may be decreased. Thus, it is necessary to compensate a decrease in the mutual capacitance caused by the floating part. In the touch panel 100 according to the exemplary embodiment of the present invention, the first touch electrode 120 is divided into the first sub-electrode 121 and the second sub-electrode 122, and, thus, the mutual capacitance is increased. That is, since the first sub-electrode 121 intersects the second touch electrode 130 at the first sub-intersection area S/A1 and the second sub-electrode 122 intersects the second touch electrode 130 at the second sub-intersection area S/A2, two intersection areas are defined in the touch pixel T/P. Therefore, the number of intersection areas in the touch area T/A of the touch panel 100 is doubled, and, thus, the number of portions where the connection electrode and the first touch electrode 120 are overlapped is also doubled. Therefore, the mutual capacitance between the first touch electrode 120 and the second touch electrode 130 may be increased. As a result, the touch panel 100 according to the exemplary embodiment of the present invention has reduced thickness and less retransmission.

Further, all of the floating part 121*f* of the first sub-electrode 121, the floating part 122*f* of the second sub-electrode 122, and the floating part 130*f* of the second touch electrode 130 are formed of TCO. Thus, there is no decrease in visibility caused by the floating parts. In particular, if a floating part and a touch detection part are formed of the same TCO, there is no difference in transmittance between the floating part and the touch detection part, and, thus, when the touch panel 100 is applied to a display device, uniform visibility can substantially be maintained.

Although not illustrated in FIG. 1 to FIG. 3A, according to some exemplary embodiments, the first touch electrode 120 and the second touch electrode 130 may be disposed on different planes. For example, the first touch electrode 120 may be extended along the first direction D1 on the substrate 110, an insulating layer may be provided to cover the first touch electrode 120, and the second touch electrode 130 may be extended along the second direction D2 on the insulating layer so as to intersect the first touch electrode 120. In this case, the first touch electrode 120 and the second touch electrode 130 on the different planes cross each other. Since the second touch electrode 130 is not divided, the connection electrode may be omitted. In this case, each of the first touch electrode 120 and the second touch electrode 130 may include a touch detection part and a floating part electrically isolated from the touch detection part.

Figure 3B:
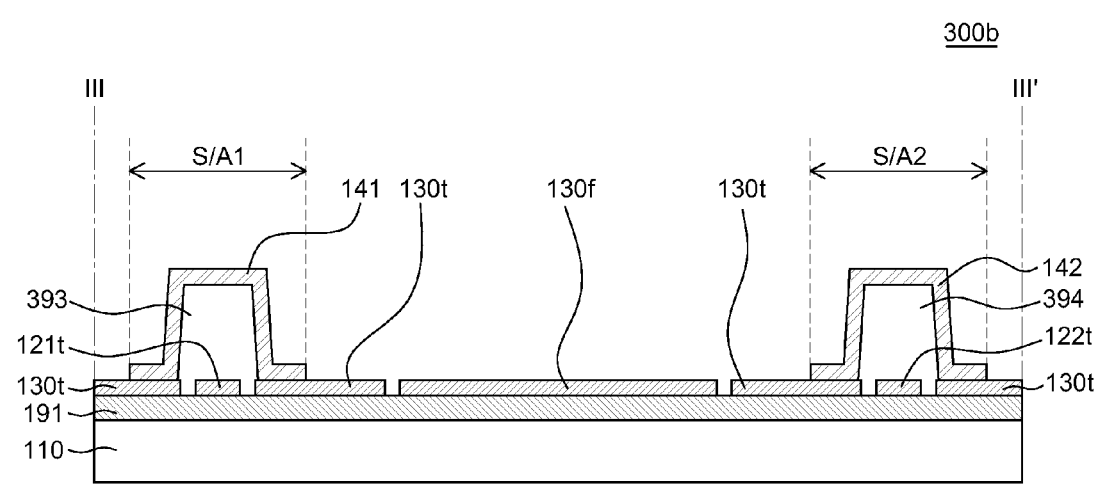
FIG. 3B is a schematic cross-sectional view of a touch panel according to another exemplary embodiment of the present invention.

FIG. 3B is a schematic cross-sectional view of a touch panel according to another exemplary embodiment of the present invention. A touch panel 300b illustrated in FIG. 3B is the same as the touch panel 100 illustrated in FIG. 3A except that a first overcoating layer 393 disposed in the first sub-intersection area S/A1 and a second overcoating layer 394 disposed in the second sub-intersection area S/A2 are included. Therefore, redundant explanation thereof will be omitted.

The first overcoating layer 393 is disposed in the first sub-intersection area S/A1. The first overcoating layer 393 covers the touch detection part 121t of the first sub-electrode 121 passing through the first sub-intersection area S/A1 and covers a part of the touch detection part 130t of the second touch electrode 130 divided at the first sub-intersection area S/A1.

The second overcoating layer 394 is disposed in the second sub-intersection area S/A2. The second overcoating layer 394 covers the touch detection part 122t of the second sub-electrode 122 passing through the second sub-intersection area S/A2 and covers a part of the touch detection part 130t of the second touch electrode 130 divided at the second sub-intersection area S/A2.

The first overcoating layer 393 and the second overcoating layer 394 may be formed at one time by a patterning process. The first overcoating layer 393 and the second overcoating layer 394 may be formed by forming an insulating layer to cover the substrate 110 including the first touch electrode 120 and the second touch electrode 130 and patterning the insulating layer.

The first connection electrode 141 is disposed on the first overcoating layer 393 and is extended along an outer surface of the first overcoating layer 393 so as to be connected with the touch detection part 130t of the second touch electrode 130 divided at the first sub-intersection area S/A1. The second connection electrode 142 is disposed on the second overcoating layer 394 and is extended along an outer surface of the second overcoating layer 394 so as to be connected with the touch detection part 130t of the second touch electrode 130 divided at the second sub-intersection area S/A2.

The touch panel 300b according to another exemplary embodiment of the present invention has reduced thickness, and retransmission may rarely occur. Further, since the overcoating layers are formed only at the first sub-intersection area S/A1 and the second sub-intersection area S/A2, when the touch panel 300b is applied to a display device, a decrease in visibility caused by the overcoating layers can be minimized. Meanwhile, the first overcoating layer 393 and the second overcoating layer 394 are not disposed on a pad of the touch panel 300b, and, thus, a step (i.e., difference of thickness) is not formed by the overcoating layers. Therefore, the touch panel 300b and a lower substrate of the display device may be easily bonded to each other.

Figure 4:
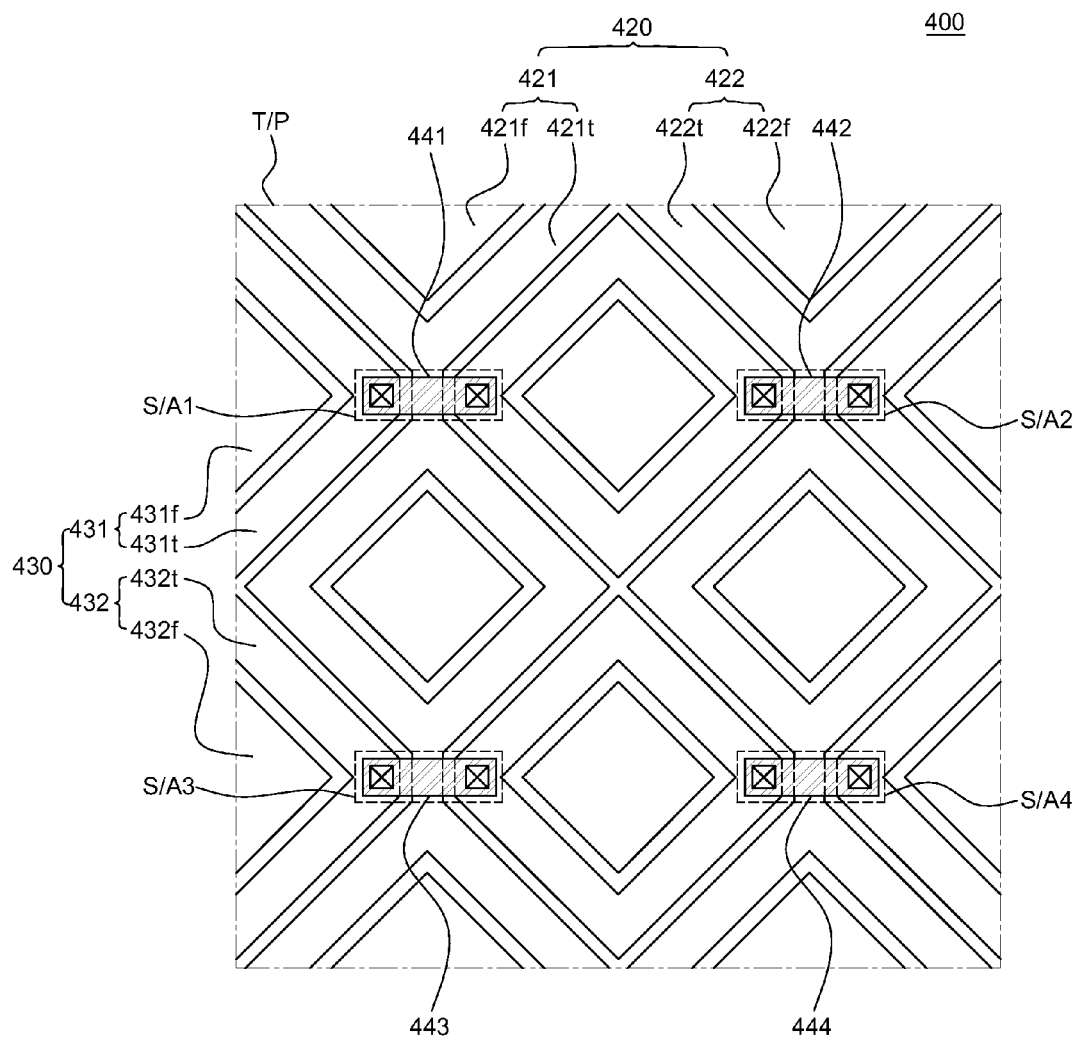
FIG. 4 is a schematic plane view of a touch pixel of a touch panel according to yet another exemplary embodiment of the present invention.

FIG. 4 is a schematic plane view of a touch pixel of a touch panel according to yet another exemplary embodiment of the present invention. A touch pixel T/P of a touch panel 400 illustrated in FIG. 4 is the same as the touch pixel T/P of the touch panel 100 illustrated in FIG. 2 except that a second touch electrode 430 includes a third sub-electrode 431 and a fourth sub-electrode 432, and a third connection electrode 443 is disposed in a third sub-intersection area S/A3, and a fourth connection electrode 444 is disposed in a fourth sub-intersection area S/A4. Therefore, redundant explanation thereof will be omitted. Although FIG. 4 illustrates an area of the touch pixel T/P being greater than that of the touch pixel T/P illustrated in FIG. 2, such illustration is provided for convenience in explanation. An actual area of the touch pixel T/P of the touch panel 400 is substantially the same as an area of the touch pixel T/P illustrated in FIG. 2.

The third sub-electrode 431 and the fourth sub-electrode 432 are connected with each other and serve as the single second touch electrode 430. The third sub-electrode 431 and the fourth sub-electrode 432 are extended in the directions parallel to each other and include electrode planes of the same shape.

The third sub-electrode 431 includes a floating part 431f and a touch detection part 431t, and the fourth sub-electrode 432 includes a floating part 432f and a touch detection part 432t. The floating part 431f of the third sub-electrode 431 is electrically isolated from the touch detection part 431t, and the floating part 432f of the fourth sub-electrode 432 is electrically isolated from the touch detection part 432t. The floating part 431f and the touch detection part 431t of the third sub-electrode 431 are substantially the same as a floating part 421f and a touch detection part 421t of a first sub-electrode 421. Also, the floating part 432f and the touch detection part 432t of the fourth sub-electrode 432 are substantially the same as a floating part 422f and a touch detection part 422t of a second sub-electrode 422. Therefore, redundant explanation thereof will be omitted.

The touch detection part 431t of the third sub-electrode 431 is divided at the first sub-intersection area S/A1, and the touch detection part 431t of the third sub-electrode 431 divided at the first sub-intersection area S/A1 is connected by a first connection electrode 441.

Further, the touch detection part 431t of the third sub-electrode 431 is divided at the second sub-intersection area S/A2, and the touch detection part 431t of the third sub-electrode 431 divided at the second sub-intersection area S/A2 is connected by a second connection electrode 442.

The touch detection part 432t of the fourth sub-electrode 432 is divided at the third sub-intersection area S/A3 and the fourth sub-intersection area S/A4. The touch detection part 432t of the fourth sub-electrode 432 divided at the third sub-intersection area S/A3 and the fourth sub-intersection area S/A4 is connected by a third connection electrode 443 and a fourth connection electrode 444, respectively.

The first connection electrode 441, the second connection electrode 442, the third connection electrode 443, and the fourth connection electrode 444 are the same except for positions thereof. Therefore, redundant explanation thereof will be omitted.

In the touch panel 400 according to yet another exemplary embodiment of the present invention, a first touch electrode 420 includes the first sub-electrode 421 and the second sub-electrode 422 and a second touch electrode 430 includes the third sub-electrode 431 and the fourth sub-electrode 432. Therefore, the number of intersection areas where the first touch electrode 420 and the second touch electrode 430 intersect each other in the touch pixel T/P may be increased to 4. That is, the number of intersection areas in the touch panel 400 increases two times than that of the touch panel 100 of FIG. 1, and a mutual capacitance between the first touch electrode 420 and the second touch electrode 430 may be further increased. That is, since a decrease in the mutual capacitance caused by the floating parts can be effectively compensated, an area of the floating parts may be more increased. Therefore, retransmission can be effectively improved.

Figure 5:
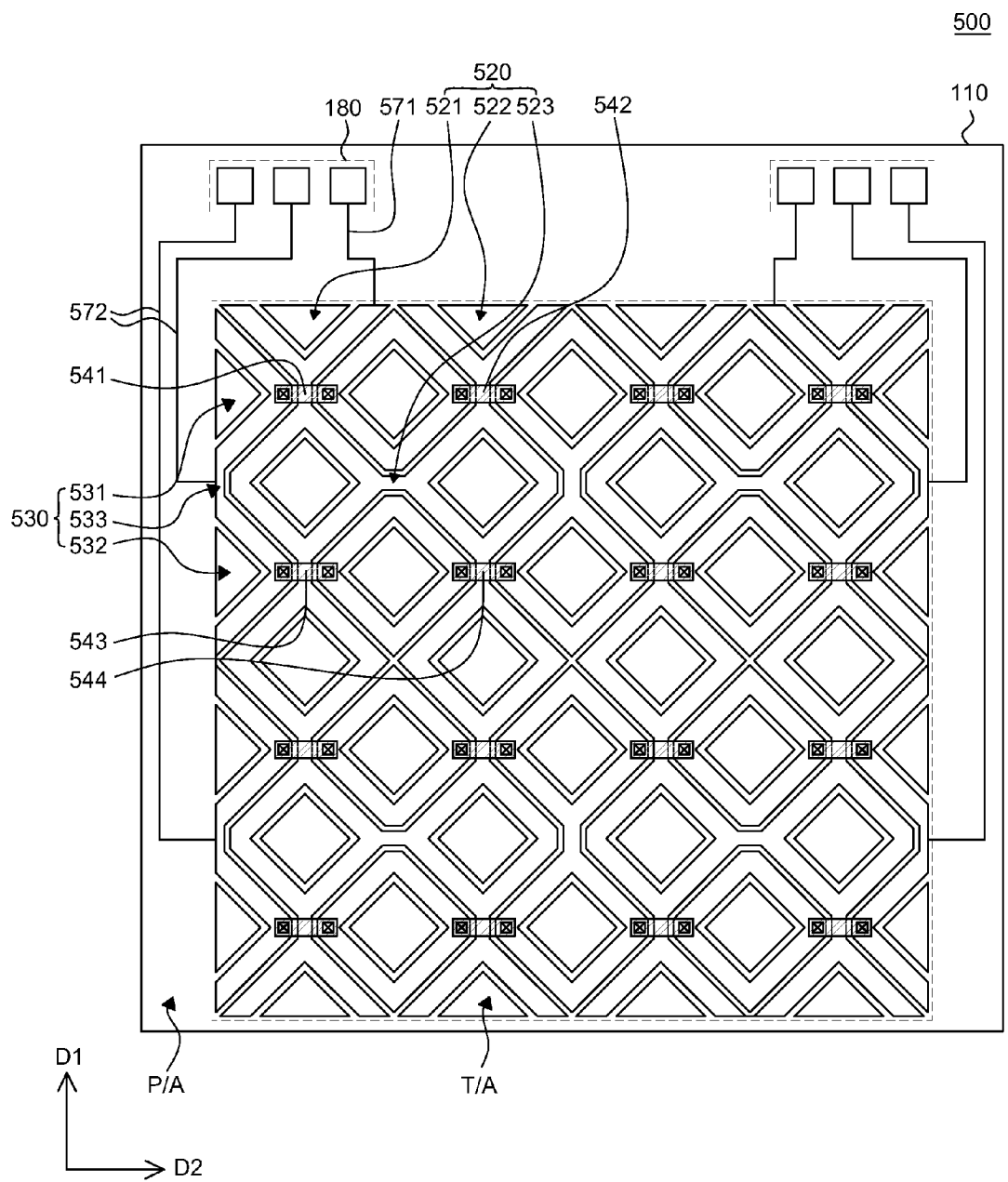
FIG. 5 is a schematic plane view of a touch panel according to still another exemplary embodiment of the present invention.

FIG. 5 is a schematic plane view of a touch panel according to still another exemplary embodiment of the present invention. A touch panel 500 illustrated in FIG. 5 is the same as the touch panel 400 illustrated in FIG. 4 except that a first sub-electrode 521 and a second sub-electrode 522 are connected with each other in a touch area T/A and a third sub-electrode 531 and a fourth sub-electrode 532 are connected with each other in the touch area T/A. Therefore, redundant explanation thereof will be omitted.

Referring to FIG. 5, the first touch electrode 520 includes a connection part 523 that connects the first sub-electrode 521 with the second sub-electrode 522 in the touch area T/A. The connection part 523 connects at least a part of electrode planes of the first sub-electrode 521 with at least a part of electrode planes of the second sub-electrode 522. FIG. 5 illustrates the first touch electrode 520 including two connection parts 523 for convenience in explanation.

The first sub-electrode 521 and the second sub-electrode 522 are connected with each other through the connection part 523 in the touch area T/A, and the third sub-electrode 531 and the fourth sub-electrode 532 are also connected with each other through the connection part 523 in the touch area T/A. Therefore, a connection routing line connecting the first sub-electrode 521 and the second sub-electrode 522 may be omitted.

In the touch panel 500 according to still another exemplary embodiment of the present invention, the first sub-electrode 521 and the second sub-electrode 522 are connected with each other in the touch area T/A and the third sub-electrode 531 and the fourth sub-electrode 532 are connected with each other in the touch area T/A. Therefore, an additional connection routing line may be omitted. Thus, a space for disposing the connection routing line may be reduced, and, thus, a peripheral area P/A of the touch panel 500 may be reduced and a bezel of the touch panel 500 may be thinned.

Figure 6:
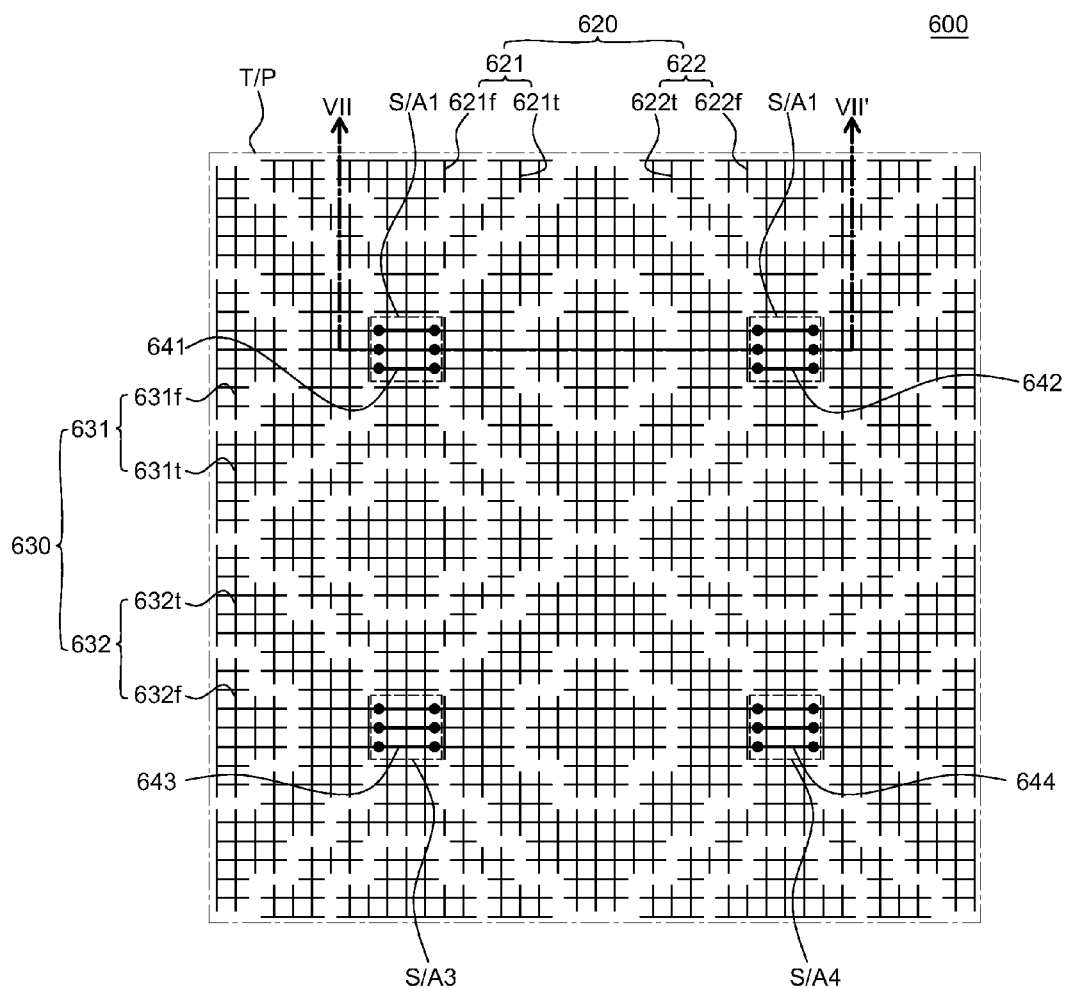
FIG. 6 is a schematic plane view of a touch pixel of a touch panel according to still another exemplary embodiment of the present invention.
Figure 7:
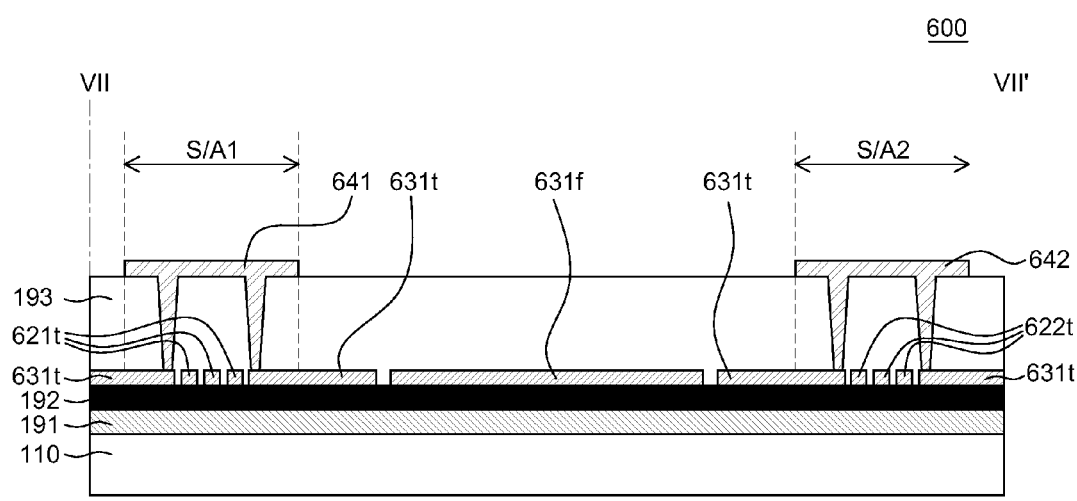
FIG. 7 is a schematic cross-sectional view of the touch panel taken along a line VII-VII' of FIG. 6.

FIG. 6 is a schematic plane view of a touch pixel of a touch panel according to still another exemplary embodiment of the present invention. FIG. 7 is a schematic cross-sectional view of the touch panel taken along a line VII-VII' of FIG. 6. A touch pixel T/P of a touch panel 600 illustrated in FIG. 6 and FIG. 7 is the same as the touch pixel T/P of the touch panel 400 illustrated in FIG. 4 except that a first touch electrode 620 and a second touch electrode 630 are metal electrodes disposed in a mesh pattern. Therefore, redundant explanation thereof will be omitted.

Referring to FIG. 6 and FIG. 7, the first touch electrode 620 is disposed in a first mesh pattern, and the second touch electrode 630 is disposed in a second mesh pattern intersecting the first mesh pattern. The first touch electrode 620 disposed in the first mesh pattern and the second touch electrode 630 disposed in the second mesh pattern may correspond having specific shapes, respectively. For example, an area defined along an outline of the first touch electrode 620 may have a shape of a plurality of diamonds, and an area defined along an outline of the second touch electrode 630 may have a shape of a plurality of diamonds. FIG. 6 illustrates parts of the first touch electrode 620 and the second touch electrode 630 that correspond to having diamond shapes.

The first touch electrode 620 and the second touch electrode 630 may be metal lines formed of a low-resistance metal. For example, the first touch electrode 620 and the second touch electrode 630 may be formed of at least one selected from the group consisting of molybdenum, aluminum, chromium, gold, titanium, nickel, neodymium, and copper, or alloys thereof. In this case, since the first touch electrode 620 and the second touch electrode 630 have a low resistance, RC-delay of the touch panel 600 may be decreased. Since the metal has a high flexibility, the touch panel 600 can be applied to a flexible display device.

As illustrated in FIG. 7, the first touch electrode 620 and the second touch electrode 630 are disposed on a black matrix 192. Since the metal has a higher reflectivity than TCO, the first mesh pattern and the second mesh pattern may be visible from the outside. However, in the touch panel 600 according to still another exemplary embodiment of the present invention, the first touch electrode 620 and the second touch electrode 630 are disposed on the black matrix 192, and, thus, the first and second mesh patterns are not visible from the outside. When the touch panel 600 is applied to a display device, visibility of the display device may not be decreased.

The first touch electrode 620 includes a first sub-electrode 621 and a second sub-electrode 622, and the first sub-electrode 621 and the second sub-electrode 622 are connected with each other. The first sub-electrode 621 includes a floating part 621*f* and a touch detection part 621*t*, and the second sub-electrode 622 includes a floating part 622*f* and a touch detection part 622*t*.

Areas defined along outlines of the floating part 621*f* of the first sub-electrode 621 and the floating part 622*f* of the second sub-electrode 622 may correspond to having specific shapes. FIG. 6 illustrates the floating parts 621*f* and 622*f* that correspond to having to diamond shapes. The areas defined along outlines of the floating part 621*f* of the first sub-electrode 621 and the floating part 622*f* of the second sub-electrode 622 have predetermined areas, respectively. For example, the areas defined along outlines of the floating parts 621*f* and 622*f* may have an area of about 10% to about 65% with respect to areas defined along outlines of the first sub-electrode 621 and the second sub-electrode 622.

The second touch electrode 630 includes a third sub-electrode 631 and a fourth sub-electrode 632, and the third sub-electrode 631 and the fourth sub-electrode 632 are connected with each other.

A touch detection part 631*t* of the third sub-electrode 631 is divided at the first sub-intersection area S/A1 and the second sub-intersection area S/A2. The touch detection part 631*t* of the third sub-electrode 631 divided at the first sub-intersection area S/A1 and the second sub-intersection area S/A2 is respectively connected by a first connection electrode 641 and a second connection electrode 642.

A touch detection part 632*t* of the fourth sub-electrode 632 is divided at the third sub-intersection area S/A3 and the fourth sub-intersection area S/A4. The touch detection part 632*t* of the fourth sub-electrode 632 divided at the third sub-intersection area S/A3 and the fourth sub-intersection area S/A4 is connected by a third connection electrode 643 and a fourth connection electrode 644.

The first connection electrode 641, the second connection electrode 642, the third connection electrode 643, and the fourth connection electrode 644 are the same except for positions thereof. Therefore, the first connection electrode 641 will be described, but explanation of the second connection electrode 642, the third connection electrode 643, and the fourth connection electrode 644 will be omitted.

The first connection electrode 641 connects the metal lines of the third sub-electrode 631 divided at the first sub-intersection area S/A1. The first connection electrode 641 includes a plurality of metal lines. FIG. 6 illustrates the first connection electrode 641 including three metal lines, but the number of metal lines is not limited thereto. The first connection electrode 641 may be formed of the same material as that of the third sub-electrode 631. In some exemplary embodiments, the first connection electrode 641 and the third sub-electrode 631 may be formed of different metals.

As described above, in the touch panel 600 according to still another exemplary embodiment of the present invention, the first touch electrode 620 and the second touch electrode 630 include metal lines disposed in a mesh pattern. Therefore, a total resistance of the touch panel 600 may be decreased. Thus, RC-delay of the touch panel 600 may be decreased and flexibility of the touch panel 600 may be improved.

Figure 8:
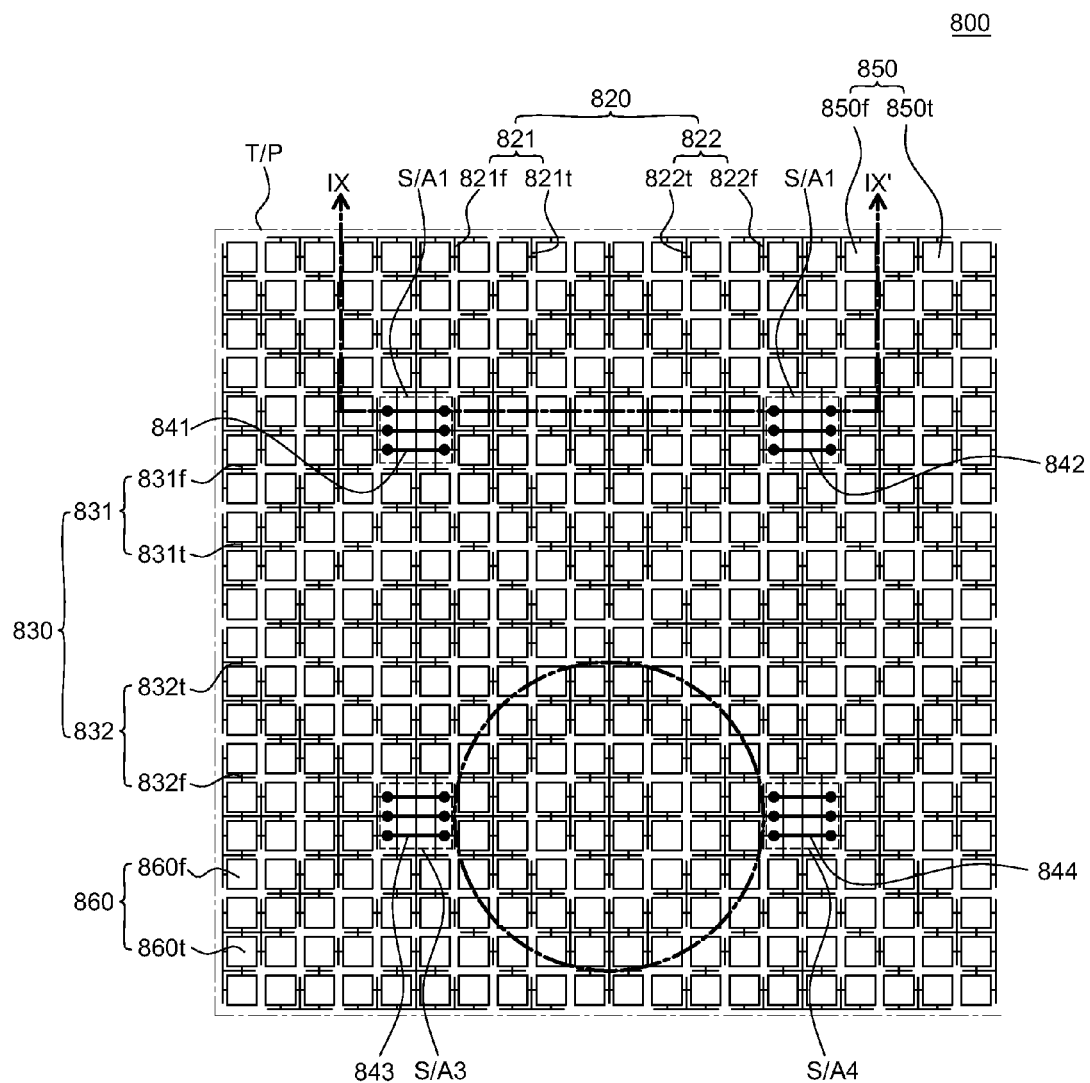
FIG. 8 is a schematic plane view of a touch pixel of a touch panel according to still another exemplary embodiment of the present invention.
Figure 9:
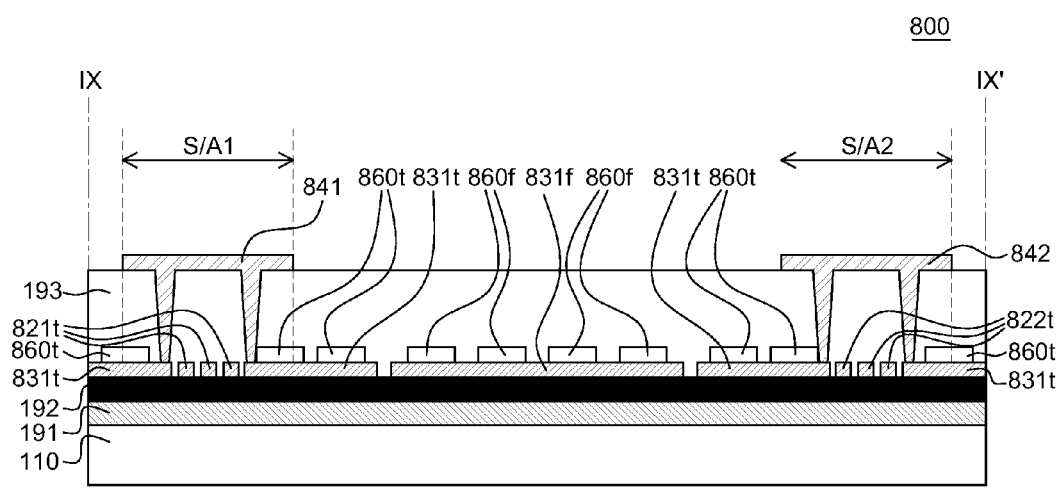
FIG. 9 is a schematic cross-sectional view of the touch panel taken along a line IX-IX' of FIG. 8.

FIG. 8 is a schematic plane view of a touch pixel of a touch panel according to still another exemplary embodiment of the present invention. FIG. 9 is a schematic cross-sectional view of the touch panel taken along a line IX-IX' of FIG. 8. A touch panel 800 illustrated in FIG. 8 and FIG. 9 is the same as the touch panel 600 illustrated in FIG. 6 and FIG. 7 except that a plurality of first segment electrodes 850 and a plurality of second segment electrodes 860 are further included. Therefore, redundant explanation thereof will be omitted. Meanwhile, a first line electrode 820 illustrated in FIG. 8 and FIG. 9 is the same as the first touch electrode 620 illustrated in FIG. 6 and FIG. 7, and a second line electrode 830 illustrated in FIG. 8 and FIG. 9 is the same as the second touch electrode 630 illustrated in FIG. 6 and FIG. 7.

Referring to FIG. 8 and FIG. 9, the first segment electrodes 850 are connected with the first line electrode 820 and the second segment electrodes 860 are connected with the second line electrode 830. The first segment electrodes 850 are substantially the same as the second segment electrodes 860 except for a kind of a line electrode connected thereto. Therefore, the first segment electrodes 850 will be described, but explanation of the second segment electrodes 860 will be omitted.

The first segment electrode 850 and the first line electrode 820 are superposed at an intersection point. The first segment electrodes 850 may substantially be disposed in uniform space therebetween. The first segment electrode 850 may be formed of TCO and includes an electrode plane having a specific shape. For example, as illustrated in FIG. 8, the first segment electrode includes a square-shaped electrode plane.

The first segment electrode 850 includes a first floating segment electrode 850$f$ and a first touch segment electrode 850$t$. The first floating segment electrode 850$f$ is respectively connected with a floating part 821$f$ of a first sub-line electrode 821 and a floating part 822$f$ of a second sub-line electrode 822. The first touch segment electrode 850$t$ is connected with a touch detection part 821$t$ of the first sub-line electrode 821 and a touch detection part 822$t$ of the second sub-line electrode 822.

The first segment electrode 850 is disposed on the first line electrode 820. Although the first segment electrode 850 is not illustrated in FIG. 9, the first segment electrode 850 is disposed on the first line electrode 820 in the same manner as the second segment electrode 860 disposed on the second line electrode 830. For example, the first floating segment electrode 850$f$ is disposed on each of the floating part 821$f$ of the first sub-line electrode 821 and the floating part 822$f$ of the second sub-line electrode 822, and the first touch segment electrode 850$t$ is disposed on each of the touch detection part 821$t$ of the first sub-line electrode 821 and the touch detection part 822$t$ of the second sub-line electrode 822.

In the touch panel 800 according to still another exemplary embodiment of the present invention, the first segment electrode 850 and the second segment electrode 860 include electrode planes, and, thus, effective capacitances of the first line electrode 820 and the second line electrode 830 are increased. Thus, touch sensitivity of the touch panel 800 can be improved. Further, the first segment electrode 850 and the second segment electrode 860 are disposed on both of the floating parts and the touch detection parts. That is, the first segment electrodes 850 and the second segment electrodes 860 are uniformly disposed on a touch area of the touch panel 800. Therefore, when the touch panel 800 is applied to a display device, there may be no decrease in visibility caused by the floating parts. Meanwhile, each of the first line electrode 820 and the second line electrode 830 includes the floating part, and, thus, a parasitic capacitance between the finger and the first line electrode 820 and a parasitic capacitance between the finger and the second line electrode 830 may be decreased. Thus, retransmission may rarely occur. Furthermore, since the number of sub-intersection areas in a touch pixel T/P of the touch panel 800 is increased, a decrease in a mutual capacitance caused by the floating parts may be compensated.

Figure 10A:
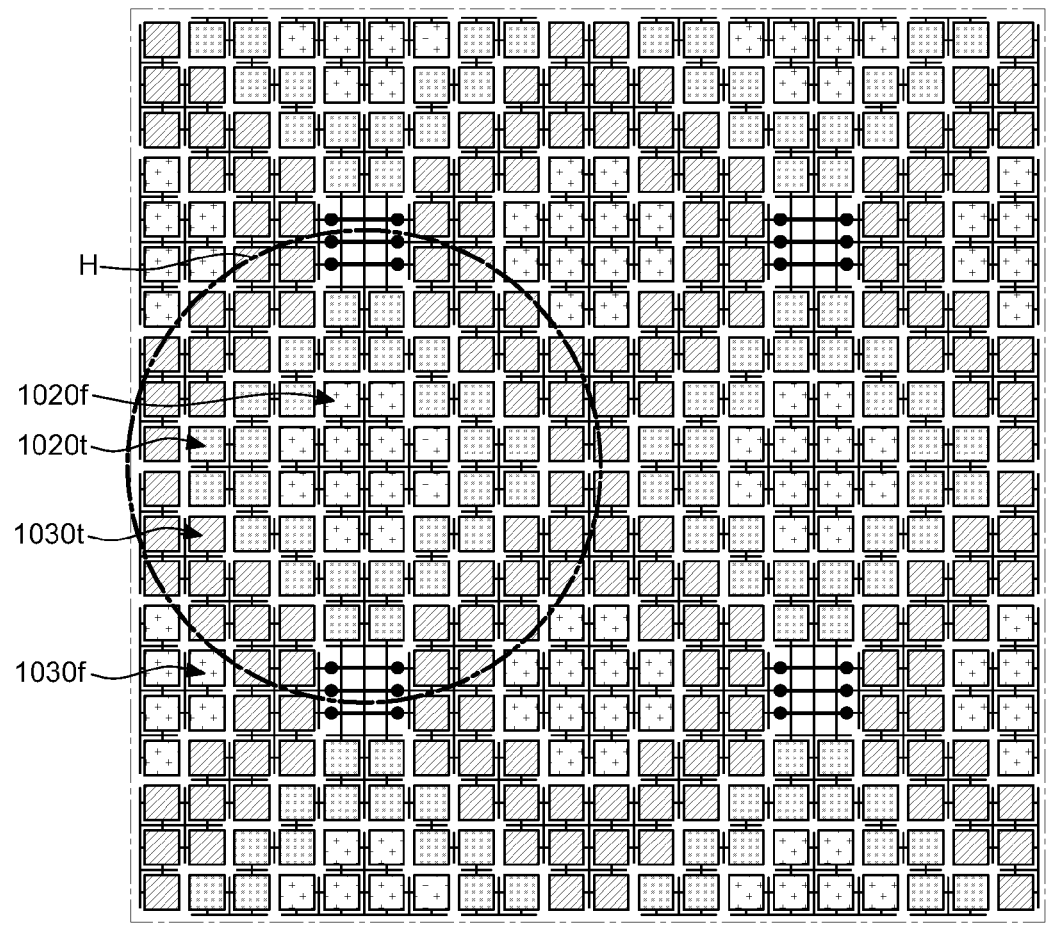
FIG. 10A to FIG. 10D are schematic plane views of a touch pixel of a touch panel according to still another exemplary embodiment of the present specification.
Figure 10B:
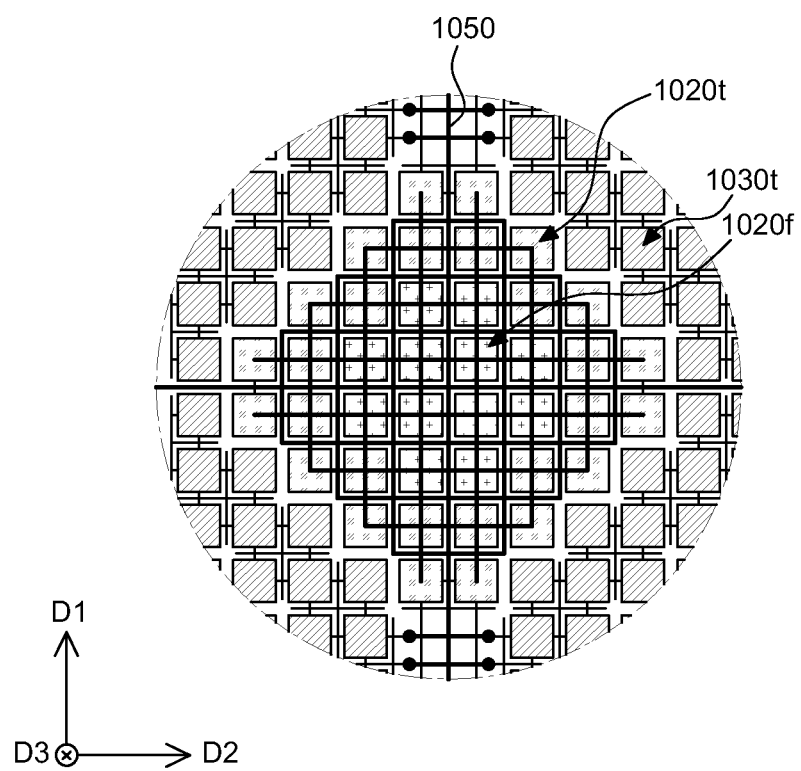
Figure 10C:
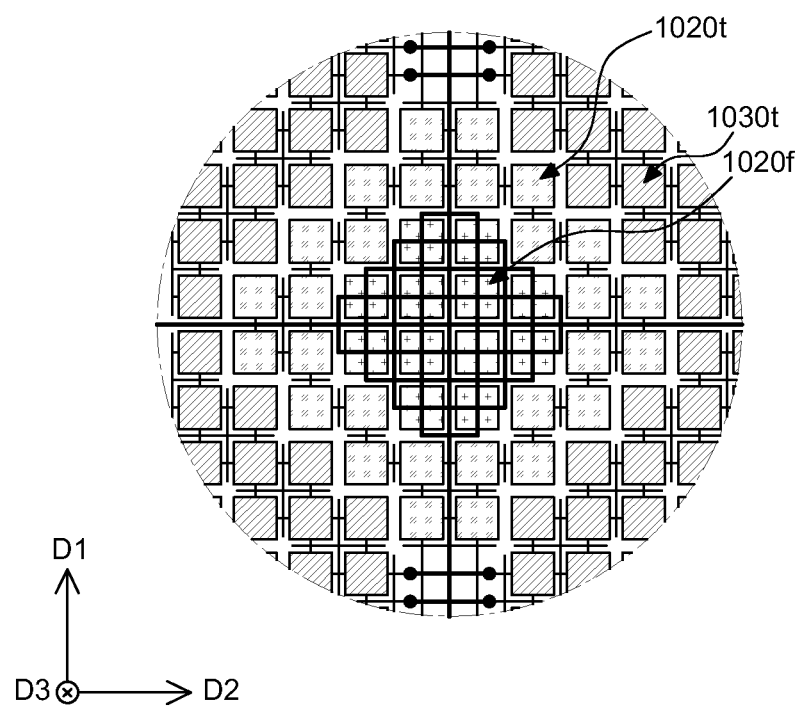
Figure 10D:
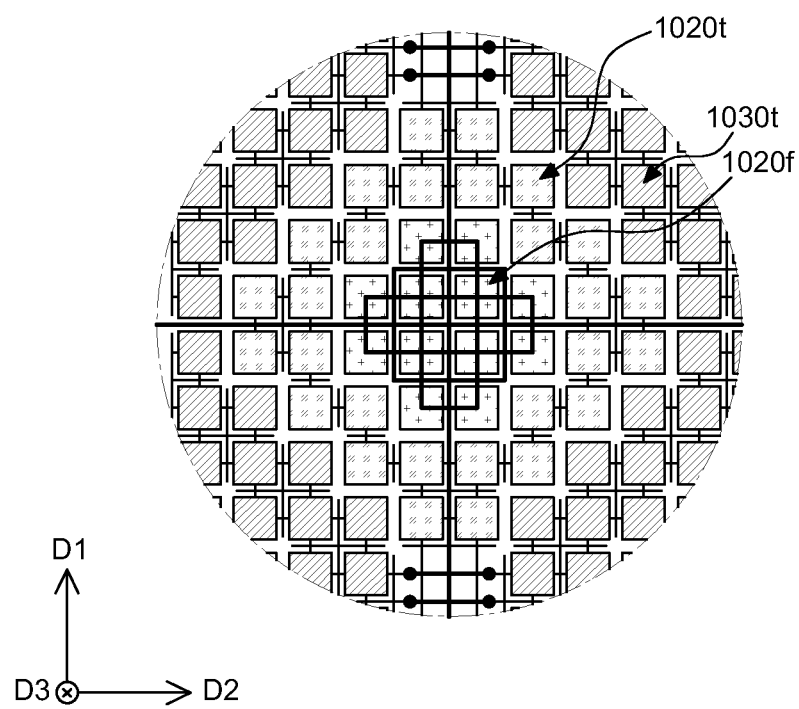

FIG. 10A to FIG. 10D are schematic plane views of a touch pixel of a touch panel according to still another exemplary embodiment of the present specification. FIG. 10B to FIG. 10D are diagrams enlarging a part H of FIG. 10A. Further, the part H corresponds to a circle indicated in FIG. 8. In FIG. 10A to FIG. 10D, a first touch electrode 1020$t$, a second touch electrode 1030$t$, floating parts 1020$f$ and 1030$f$, and the like are hatched in different manners for convenience in identification.

In the following exemplary embodiment, a ground electrode is further included in the touch pixel illustrated in FIG. 1 to FIG. 9. The ground electrode 1050 is disposed as being divided into the first touch electrode 1020$t$ and the second touch electrode 1030$t$, and the ground electrode is disposed in a third direction D3 on the floating parts 1020$f$ and 1030$f$. Herein, the third direction refers to a direction perpendicular to the first and second directions D1 and D2, and also refers to a direction in which the layers of the display device including the touch panel are laminated. In FIG. 10A to FIG. 10D, a touch electrode is formed of a line electrode and a segment electrode as illustrated in FIG. 8. However, the present exemplary embodiment can be applied to the touch electrode structure illustrated in FIG. 1, FIG. 5, or FIG. 6.

The ground electrode has a ground potential (for example: 0 V) and forms a certain capacitance between the first touch electrode or the second touch electrode. The formed capacitance reduces a capacitance between a touching object and a touch electrode by a certain amount and thus reduces retransmission. This will be explained below with reference to FIG. 11.

Figure 11:
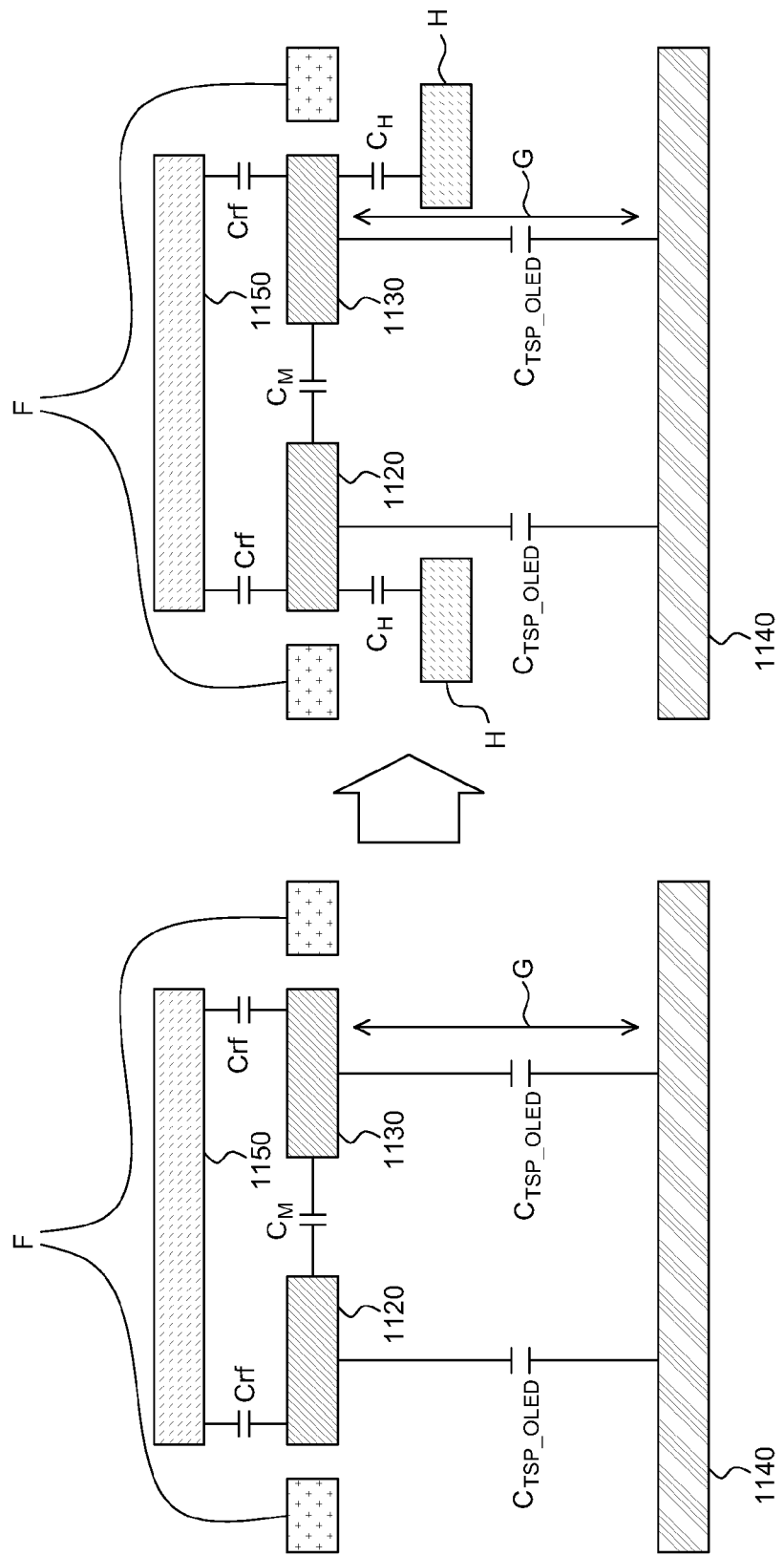
FIG. 11 is a conceptual diagram provided to describe a function of a touch panel according to still another exemplary embodiment of the present specification.

FIG. 11 is a conceptual diagram provided to describe a function of a touch panel according to still another exemplary embodiment of the present specification.

With development in technology for bonding upper/lower plates of a display panel, a cell gap has been decreased. A cell gap typically refers to a distance between an upper substrate and a lower substrate. In a structure of the present specification, it means a distance between a touch electrode and a cathode 1140. Referring to the left picture in FIG. 11, in the case of a structure (particularly, an in-cell touch structure) having a small cell gap G, a capacitance $C_{TSP\text{-}OLED}$ formed between touch electrodes 1120 and 1130 and a cathode electrode 1140 is high, and, thus, a capacitance Crf between the touch electrodes 1120 and 1130 and a touching object 1150 may be decreased.

However, with current technology, it is difficult to greatly reduce a cell gap to secure stable reliability of a panel. Therefore, a distance between the touch electrodes 1120 and 1130 is relatively high (i.e., $C_{TSP\text{-}OLED}$ is not sufficiently high), and, thus, an effect of the decrease in Crf is weakened. As a result, since the capacitance Crf between the touch electrodes 1120 and 1130 and the touching object 1150 is relatively high, there is a possibility of retransmission.

The right picture in FIG. 11 illustrates an exemplary embodiment for reducing retransmission caused by Crf. Referring to this picture, a ground electrode capable of forming a predetermined capacitance CH between the first touch electrode 1120 or the second touch electrode 1130 is added. The CH compensates "the decrease in $C_{TSP\text{-}OLED}$ caused by the increase in the cell gap G", and, thus, it is possible to reduce the possibility of retransmission. Further, by adjusting the CH according to a size of the cell gap G, the retransmission caused by the capacitance Crf between the touch electrode and the touching object can be reduced.

The ground electrode is disposed in the third direction perpendicular to the direction of the first electrode (first direction) and the direction of the second electrode (second direction) with respect to the floating parts. Further, the ground electrode may be positioned in the third direction at an area corresponding to an area for the floating part. Referring to FIG. 10B to FIG. 10D, the ground electrode 1050 is disposed so as to correspond to each floating part in the third direction. Although, in FIG. 10B to FIG. 10D, the ground electrodes are illustrated as cross lines, the ground electrodes may be configured in various lines or planes having various shapes.

Meanwhile, an area for the ground electrode may vary depending on a distance (cell gap) between the upper substrate (first substrate) and the lower substrate (second substrate). For example, if the cell gap is relatively great, the area for the ground electrode may be formed to be greater than an area for the floating part (FIG. 10B). On the other hand, if the cell gap is relatively small, the area for the ground electrode may be formed to be smaller than the area for the floating part (FIG. 10D). FIG. 10C illustrates disposition of ground electrodes when a display device has a cell gap between the case illustrated in FIG. 10B and the case illustrated in FIG. 10D. It can be seen that the cell gap in the display device illustrated in FIG. 10B to FIG. 10D is decreased in sequence from FIG. 10B to FIG. 10C and FIG. 10D.

The plurality of ground electrodes are electrically connected with each other. In this case, conductive lines connecting the plurality of ground electrodes may be disposed so as to pass through the center of an intersection point (node) between the first and second touch electrodes in order to minimize an effect on a capacitance CM between the touch electrodes. For example, a ground electrode may be connected with another adjacent ground electrode by a conductive connection line passing through the center of a connection electrode. Further, the conductive lines connecting the ground electrodes are gathered outside the touch area in order to minimize a parasitic capacitance.

Figure 12:
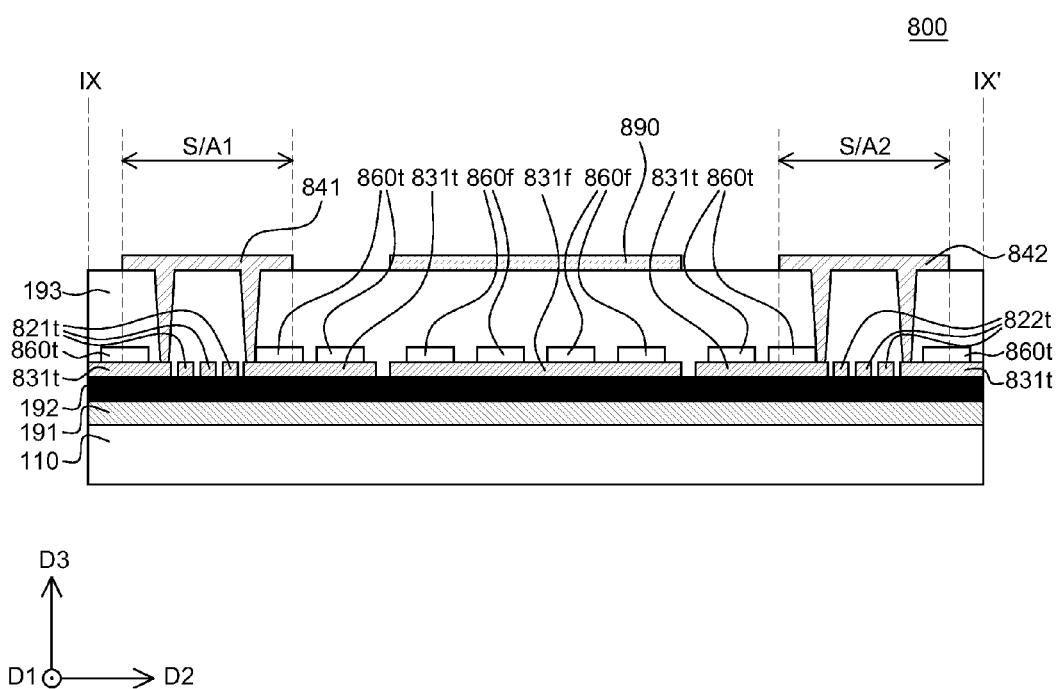
FIG. 12 is a schematic cross-sectional view of the touch panel illustrated in FIG. 10 to FIG. 11.

FIG. 12 is a schematic cross-sectional view of the touch panel illustrated in FIG. 10A to FIG. 11. The touch panel 800 illustrated in FIG. 12 is the same as the touch panel illustrated in FIG. 9 except that a ground electrode 890 is further included. Therefore, redundant explanation thereof will be omitted.

The ground electrode 890 may be disposed on the overcoating layer 193. Herein, the ground electrode may be formed by the same process as connection electrodes 841 and 842. As can be seen from FIG. 12, the ground electrode 890 may be positioned at an area corresponding to an area for floating parts 831*f* and 860*f*. The ground electrode 890 may be disposed in the third direction D3.

Figure 13:
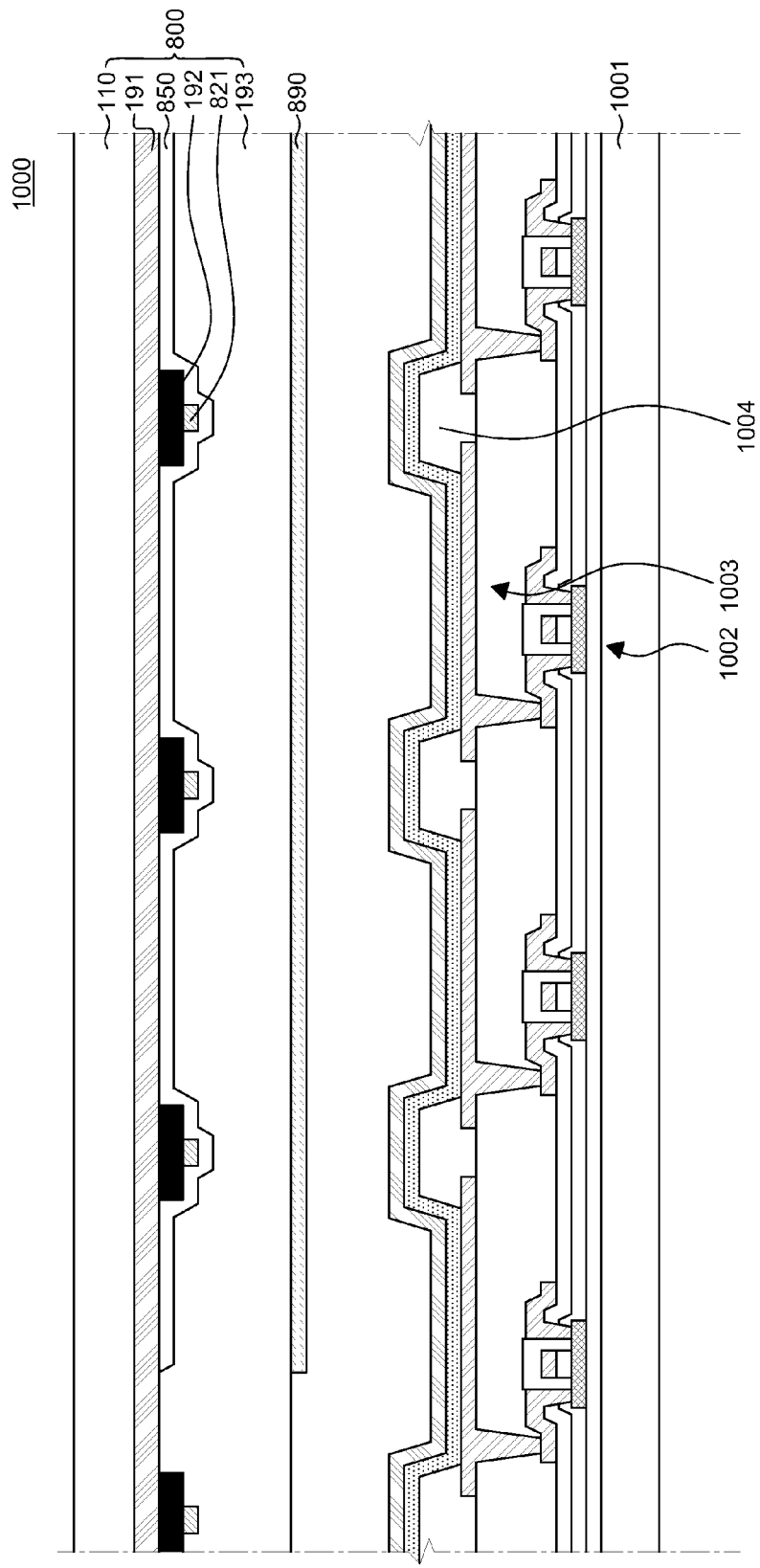
FIG. 13 is a schematic cross-sectional view of a touch panel-integrated organic light emitting display device according to an exemplary embodiment of the present specification.

FIG. 13 is a schematic cross-sectional view of a touch panel-integrated organic light emitting display device according to an exemplary embodiment of the present specification. The touch panel 800 included in an organic light emitting display device 1000 illustrated in FIG. 13 is the same as the touch panel 800 illustrated in FIG. 12. Therefore, redundant explanation thereof will be omitted. For convenience in explanation, FIG. 12 illustrates only the first sub-line electrode 821 and the first segment electrodes 850 disposed on the first sub-line electrode 821. Referring to FIG. 13, the organic light emitting display device 1000 includes a lower substrate 1001, a thin film transistor 1002, an organic light emitting element 1003, and a touch panel 800.

The lower substrate 1001 supports various components of the organic light emitting display device 1000. The lower substrate 1001 may be a glass substrate or a plastic substrate. In some exemplary embodiments, the lower substrate 1001 may be a flexible substrate having flexibility.

The thin film transistor 1002 is disposed on the lower substrate 1001. The thin film transistor 1002 is connected with the organic light emitting element 1003 and turns on or off the organic light emitting element 1003.

The organic light emitting element 1003 forms a pixel of the organic light emitting display device 1000, and includes a cathode, an anode, and an organic light emitting layer interposed between the cathode and the anode. The organic light emitting element 1003 emits a light of a specific wavelength. For example, the organic light emitting layer may emit any one of lights of red, green, blue, and white.

A bank layer 1004 separates the organic light emitting elements 1003 from each other and is arranged between the adjacent organic light emitting elements 1003.

The color filter layer 191 is disposed under the upper substrate 110, and includes red, green and blue color filters. The organic light emitting element 1003 can display a specific color through a color filter layer. In some exemplary embodiments, the color filter layer 191 may be omitted. For example, each organic light emitting element 1003 may emit a light of red, green, or blue. In this case, the color filter layer 191 may be omitted.

The black matrix 192 is disposed under the color filter layer 191 of the upper substrate 110 so as to correspond to the bank layer 1004. If the color filter layer 191 is omitted, the black matrix 192 may be disposed under the upper substrate 110. The black matrix 192 prevents mixing of lights emitted from the organic light emitting elements 1003.

The first and second line electrodes are disposed under the black matrixes 192, respectively. That is, the first sub-line electrode 821, the second, third and fourth sub-line electrodes are disposed under the black matrixes 192, respectively. Therefore, when the organic light emitting display device 1000 is viewed from the top of the upper substrate 110, the first sub-line electrode 821, the second, third and fourth sub-line electrodes are not visible from the outside. Therefore, there is no Moire effect that the first and second mesh patterns are visible from the outside.

The ground electrode 890 may be disposed on the overcoating layer 193. Herein, the ground electrode 890 may be positioned at an area corresponding to the segment electrodes 850 included in the floating part.

In the organic light emitting display device 1000 according to an exemplary embodiment of the present invention, even if thickness of the touch panel 800 is small, retransmission rarely occurs. Therefore, the organic light emitting display device 1000 can be thinned. Meanwhile, the touch panel 800 has a high flexibility due to the first and second line electrodes, and, thus, the organic light emitting display device 1000 can be used as a flexible display device.

Figure 14:
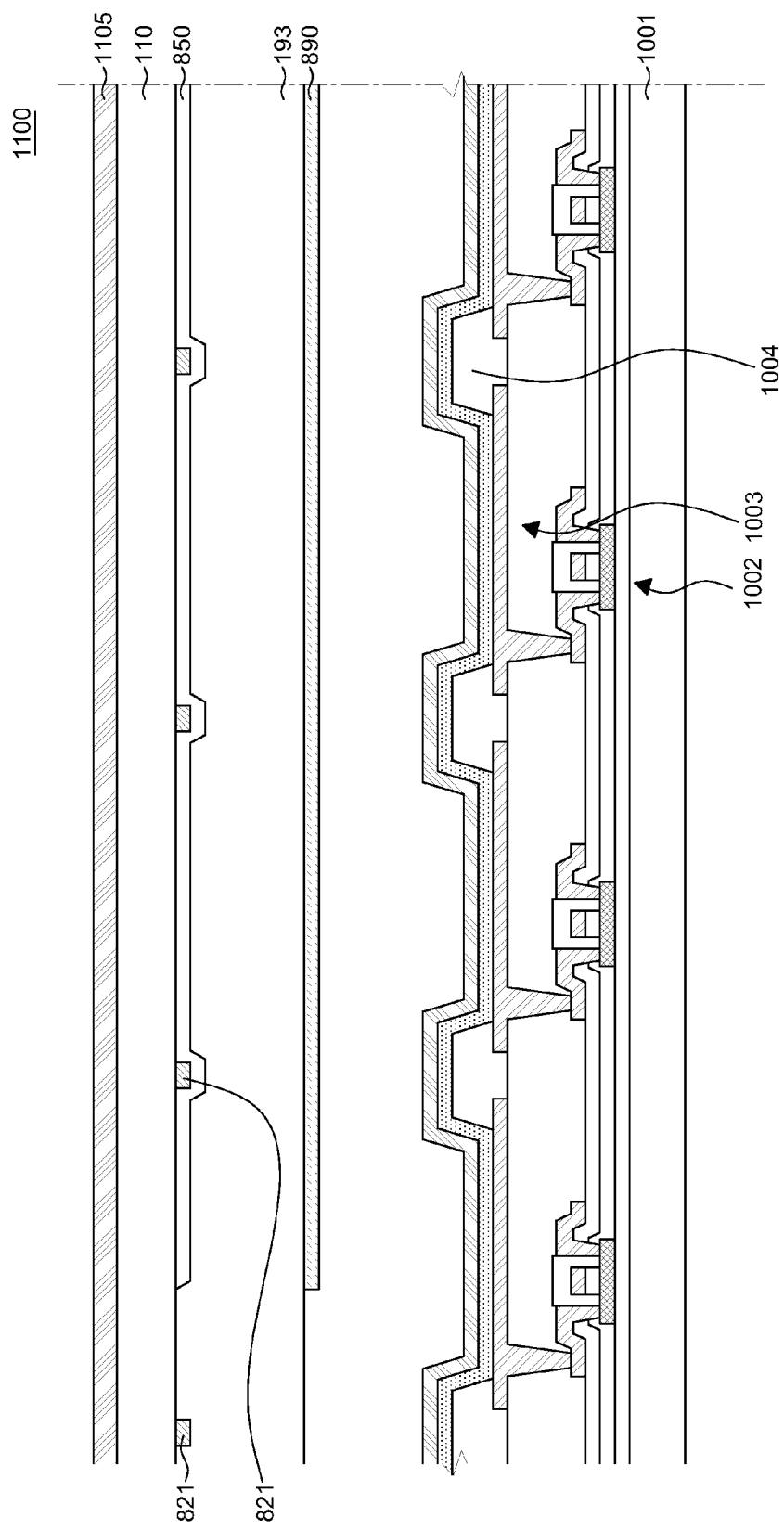
FIG. 14 is a schematic cross-sectional view of a touch panel-integrated organic light emitting display device according to another exemplary embodiment of the present specification.

FIG. 14 is a schematic cross-sectional view of a touch panel-integrated organic light emitting display device according to another exemplary embodiment of the present specification. An organic light emitting display device 1100 illustrated in FIG. 14 is the same as the organic light emitting display device 1000 illustrated in FIG. 13 except that the black matrix 192 and the color filter layer 191 are not included but a polarizer 1105 is included. Therefore, redundant explanation thereof will be omitted.

Referring to FIG. 14, the polarizer 1105 is disposed on the upper substrate 110 and reduce reflection of external light which may occur in the first sub-line electrode 821, the second, third and fourth sub-line electrodes.

The first sub-line electrode 821, the second, third and fourth sub-line electrodes are disposed so as to be overlapped with the bank layer 1004. A portion in which the bank layer 1004 is disposed does not emit a light from the organic light emitting element 1003. Thus, the first sub-line electrode 821, the second, third and fourth sub-line electrodes may not decrease visibility of the organic light emitting display device 1100. In some exemplary embodiments, the bank layer 1004 may be a black bank layer having a low reflectivity. In this case, the first sub-line electrode 821, the second, third and fourth sub-line electrodes may be rarely visible from the outside due to the black bank layer, and visibility of the organic light emitting display device 1100 may be further improved.

In the organic light emitting display device 1100 according to another exemplary embodiment of the present invention, the black matrix 192 and the color filter layer 191 are omitted. Therefore, a thickness of the organic light emitting display device 1100 may be further decreased, and flexibility of the organic light emitting display device 1100 may be further improved.

Although the exemplary embodiments of the present invention have been described in detail with reference to the accompanying drawings, the present invention is not limited thereto and may be embodied in many different forms without departing from the technical concept of the present invention. Therefore, the exemplary embodiments of the present invention are provided for illustrative purposes only but not intended to limit the technical concept of the present invention. The scope of the technical concept of the present invention is not limited thereto. Therefore, it should be understood that the above-described exemplary embodiments are illustrative in all aspects and do not limit the present invention. The protective scope of the present invention should be construed based on the following claims, and all the technical concepts in the equivalent scope thereof should be construed as falling within the scope of the present invention.

What is claimed is:

1. A touch panel comprising:
an array of first touch electrodes connected in a first direction on an inner surface of a first substrate;
an array of second touch electrodes, in a same plane as the first touch electrodes, connected in a second direction perpendicular to the first direction on the inner surface of the first substrate; and
an array of electrically floating parts in at least one of the first and second touch electrodes, the floating parts configured to increase touch sensitivity by minimizing parasitic capacitance generated between touch detection parts of the first touch electrodes and an electrostatic object, or generated between touch detection parts of the second touch electrodes and the electrostatic object,
wherein the first and second touch electrodes include line electrodes disposed in a mesh pattern and a plurality of segment electrodes connected with the line electrodes at an intersection point of the line electrodes, and
wherein the plurality of segment electrodes include touch segments directly connected with the touch detection part of the line electrodes and floating segments directly connected with the floating part of the line electrodes.

2. The touch panel according to claim 1, wherein each floating part has a surface area that is 10% to 65% of a total surface area of each first touch electrode or each second touch electrode.

3. The touch panel according to claim 1, further comprising a ground electrode, corresponding to the floating parts, separated from and on a different plane than the first and second touch electrodes.

4. The touch panel according to claim 3, wherein the ground electrode has a ground potential, and forms a capacitance with respect to the first touch electrode or the second touch electrode.

5. The touch panel according to claim 4, wherein a size of the ground electrode depends upon a gap between the first substrate and a second substrate opposite to the first substrate.

6. The touch panel according to claim 5, further comprising a plurality of connection electrodes connecting the second touch electrodes in the second direction, and
wherein adjacent ground electrodes are connected to each other by a conductive connection line passing through the center of one connection electrode.

7. The touch panel according to claim 1, further comprising a polarizer on the first substrate, and
wherein the first and second touch electrodes are disposed on a black matrix.

8. The touch panel according to claim 1, wherein the first and second touch electrodes and the floating parts are implemented in a organic light emitting display device.

9. A touch panel for an imaging device, comprising:
an array of touch panels including a plurality of touch planes arranged in a touch area of a substrate, the touch planes including first touch electrodes extending in a first direction, and second touch electrodes extending in a second direction different from the first direction; and
connection electrodes connecting the second touch electrodes in the second direction,
wherein the first touch electrodes include a first subelectrode and a second subelectrode, wherein each of the first sub-electrode and the second sub-electrode includes a floating part and a touch detection part surrounding and electrically separated from the floating part, and wherein the second touch electrode is divided into a first sub-section and a second subsection, the touch detection part of the first sub-electrode passing between the first sub-section and the second sub-section in the first direction, wherein the second touch electrode includes a floating part and a touch detection part, wherein the first and second touch electrodes include line electrodes disposed in a mesh pattern and a plurality of segment electrodes connected with the line electrodes at an intersection point of the line electrodes, and wherein the plurality of segment electrodes include touch segments directly connected with the touch detection part of the line electrodes and floating segments directly connected with the floating part of the line electrodes.

10. The touch panel for an imaging device of claim 9, further comprising a plurality of pads in the peripheral area surrounding the touch area of the substrate.

11. The touch panel for an imaging device of claim 10, wherein the first sub-section and the second sub-section of the second touch electrode are connected to each other by a connection routing line in the peripheral area of the substrate.

12. The touch panel for an imaging device of claim 11, wherein the touch detection part is connected to the pads via a first routing line and the connection routing line.

13. The touch panel for an imaging device of claim 9, further comprising a ground electrode corresponding to an area of each of the floating parts on the substrate, wherein the ground electrode is separated from and on a different plane than touch planes of the first touch electrode and the second touch electrode.

14. The touch panel for an imaging device of claim 13, wherein the ground electrode has a ground potential, and forms a capacitance with respect to the first touch electrode or the second touch electrode.

15. The touch panel for an imaging device of claim 14, wherein a size of the ground electrode depends upon a distance between the first and second touch electrodes and a cathode of the imaging device.

16. The touch panel for an imaging device of claim 9, wherein the floating part has an area of 10%-65% of a total area of the first touch electrode.

17. The touch panel for an imaging device of claim 9, further comprising an overcoat layer on the first and second touch electrodes, wherein the connection electrodes connect the touch detection parts of the second of the second touch electrodes via contact holes in the overcoat layer.

18. The touch panel for an imaging device of claim 9, wherein the second touch electrodes include a first sub-electrode and a second sub-electrode.

* * * * *